United States Patent [19]

Moore et al.

[11] Patent Number: 5,067,760
[45] Date of Patent: Nov. 26, 1991

[54] PLATFORM/GRILL COVER UNIT FOR USE ON A LAND VEHICLE

[76] Inventors: Daniel E. Moore; Dolores Moore, both of 6444 Neibauer Rd., Rte. 1, Billings, Mont. 59106

[21] Appl. No.: 665,561

[22] Filed: Mar. 6, 1991

[51] Int. Cl.⁵ .............................................. B60R 19/52
[52] U.S. Cl. .................................... 293/115; 293/117; 280/164.1; 180/68.6
[58] Field of Search ................ 293/38, 115, 116, 117, 293/155; 280/164.1; 180/68.6; D12/171, 203

[56] References Cited

U.S. PATENT DOCUMENTS

| | | | |
|---|---|---|---|
| D. 182,408 | 4/1958 | Faulhaber | D12/171 |
| 2,572,477 | 10/1951 | Harden . | |
| 3,834,478 | 9/1974 | Alexander . | |
| 4,099,760 | 7/1978 | Mascotte et al. | 293/115 |
| 4,125,214 | 11/1978 | Penn | 293/117 X |
| 4,168,855 | 9/1979 | Koch | 293/115 |

*Primary Examiner*—Dennis H. Pedder
*Attorney, Agent, or Firm*—Terry M. Gernstein

[57] ABSTRACT

A base unit is fixed to the front bumper of a land vehicle, such as a light truck, and a platform is pivotally mounted to that base to move between a deployed position horizontally extending forwardly of the front bumper and a stored position extending upwardly from the front bumper in front of the vehicle grill. A lock keeps the platform in the stored position, and a stop keeps the platform in the deployed position.

1 Claim, 5 Drawing Sheets

PLATFORM/GRILL COVER UNIT FOR USE ON A LAND VEHICLE

TECHNICAL FIELD OF THE INVENTION

The present invention relates to the general art of land vehicles, and to the particular field of accessories for land vehicles.

BACKGROUND OF THE INVENTION

Trucks, especially light trucks, have become extremely popular in recent years. Such trucks have always been useful on a farm and for light hauling. Some of these trucks have an engine compartment which is difficult to reach for many people, especially short people. As trucks become ever more popular, the number of people servicing their own trucks has increased. This is so for all service jobs, but is especially true for simple jobs such as oil changes and the like.

If the engine compartment is located well above ground level, it may be difficult for someone to service their own truck. Some people use stepladders, stools or the like. However, such devices are difficult to use, and may not be available in the event of a breakdown. Such devices may even be unsafe in some circumstances.

The art also contains several devices which are similar to a scooter used by mechanics to service the underbody of a vehicle, but which can elevate a user above the engine compartment. However, such devices are expensive to purchase and are not always available for use.

Therefore, there is a need for a device which can elevate a user to a level suitable for servicing the truck engine. However, such device must be readily available at all times, yet be storable in an out-of-the way location in a manner which prevents that device from interfering with the proper and safe operation of the vehicle. The device must also be easily deployable into a configuration which is safe and sturdy for use.

Still further, many light trucks have a great deal of equipment located in the front of the engine compartment. Such equipment, including the grill of the truck, can be subject to damage in the event of a head-on collision between the truck and another object.

Therefore, in addition to the above, there is a need for a device which can also protect the front end of a vehicle from damage due to a collision involving the front end of the vehicle.

OBJECTS OF THE INVENTION

It is a main object of the present invention is to provide a device which can elevate a user to a level suitable for servicing the truck engine.

It is another object of the present invention to provide a device which can elevate a user to a level suitable for servicing the truck engine and which is readily available at all times.

It is another object of the present invention to provide a device which can elevate a user to a level suitable for servicing the truck engine and which is readily available at all times, yet be storable in an out-of-the way location in a manner which prevents that device from interfering with the proper and safe operation of the vehicle.

It is another object of the present invention to provide a device which can elevate a user to a level suitable for servicing the truck engine and which is readily available at all times, yet be storable in an out-of-the way location in a manner which prevents that device from interfering with the proper and safe operation of the vehicle and which is easily deployable into a configuration which is safe and sturdy for use.

It is another object of the present invention to provide a device which can elevate a user to a level suitable for servicing the truck engine and which is readily available at all times, yet be storable in an out-of-the way location in a manner which prevents that device from interfering with the proper and safe operation of the vehicle and which is easily deployable into a configuration which is safe and sturdy for use and which can also protect the front end of a vehicle from damage due to a collision involving the front end of the vehicle.

SUMMARY OF THE INVENTION

These, and other, objects are achieved by a device which is mounted on the front surface of a bumper of a truck and which is pivotal from an out-of-the way stored condition to a deployed condition. In the stored condition, the devices protects the grill of the vehicle, and in the deployed condition the device provides a sturdy and stable platform which elevates a user above the ground at a level high enough to provide easy access to the engine compartment, even for a short user.

BRIEF DESCRIPTION OF THE DRAWING FIGURES

DETAILED DESCRIPTION OF THE PREFERRED EMBODIMENT OF THE INVENTION

Figure 1:
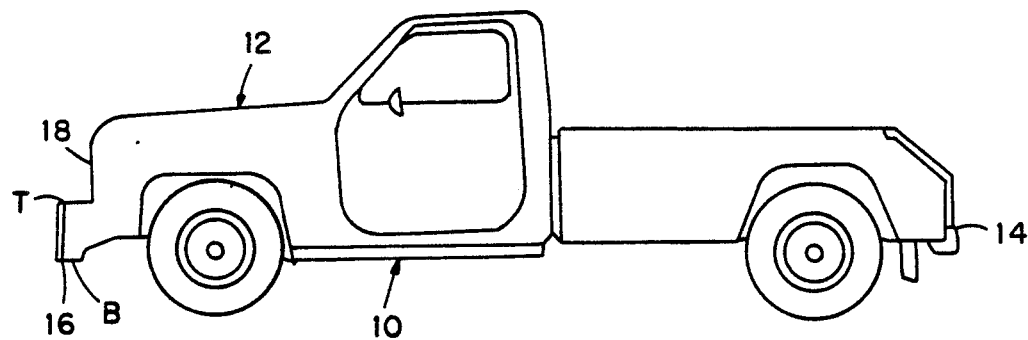
FIG. 1 is a side elevational view of a prior art light truck.

Shown in FIG. 1 is a light truck 10 which can be a pick up truck, a towing truck or the like. The truck includes the usual engine compartment 12, rear bumper 14 and front bumper 16 located immediately subadjacent to the engine compartment. The vehicle also includes a grill 18 As discussed above, the engine compartment is most easily accessible from above. If the worker is short, access to the engine compartment may be difficult. Still further, those parts of the engine located in the front of the truck may be vulnerable to damage due to collision, or the like.

Figure 2:
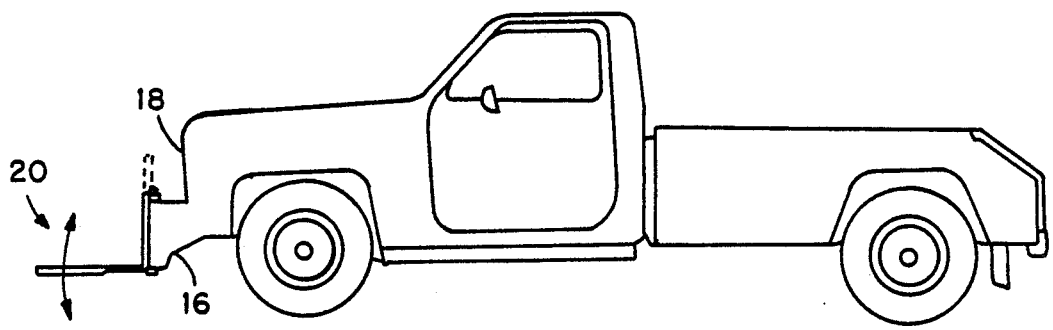
FIG. 2 is a side elevational view of a light truck having a device on the front bumper thereof embodying the present invention and which is deployable into a configuration for elevating a user into a position to make access to the engine compartment of the truck easy, and also will protect the front end of the truck when in the store configuration.

Accordingly, as shown in FIG. 2, the present invention is embodied in a device 20 which is affixed to the front bumper 16 to move from a deployed condition shown in full lines in FIG. 2 extending horizontally outwardly from the front bumper, to a stored condition shown in dotted lines in FIG. 2 extending vertically upward from the front bumper in front of the vehicle grill 18. In this manner, the device 20 can serve as a protector when in the stored condition, yet is easily deployed to be a platform for supporting a user when work is to be performed on the vehicle.

Figure 3:
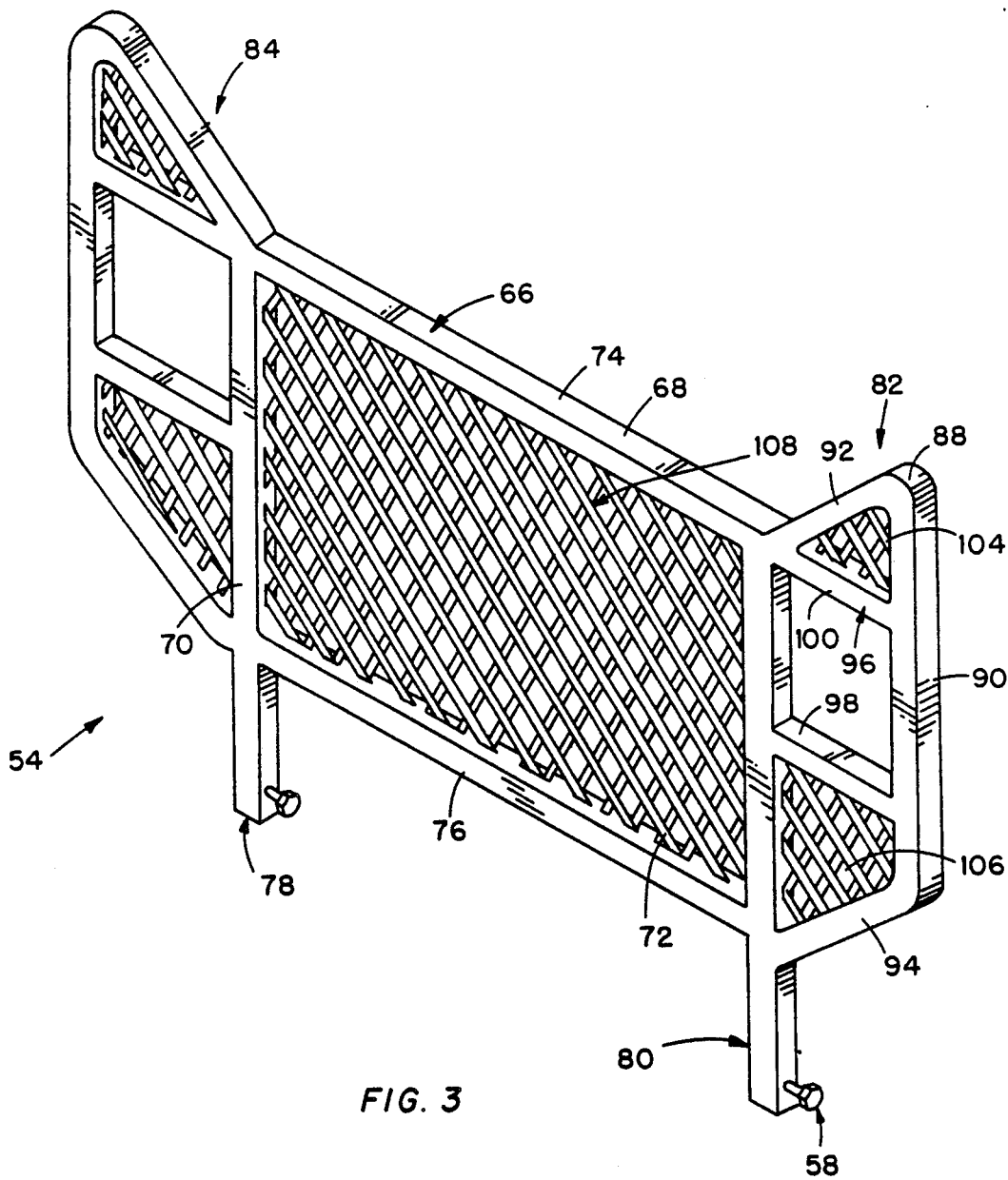
FIG. 3 is a perspective view of a platform/grill cover unit of the device of the present invention.
Figure 4:
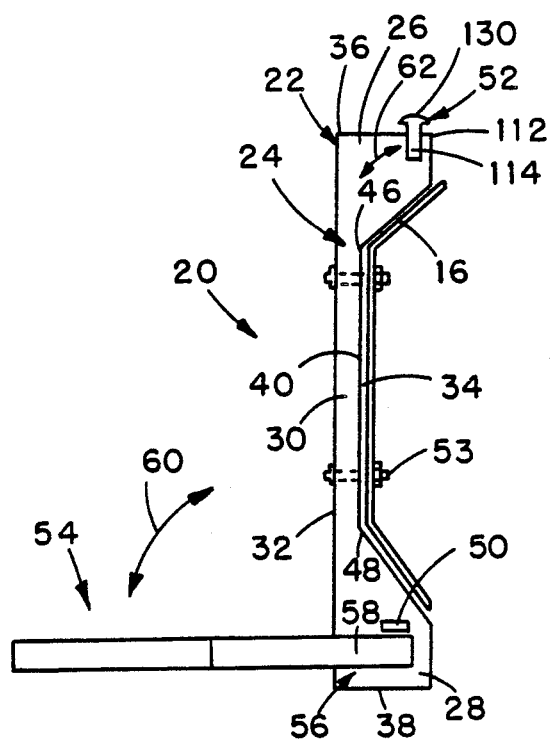
FIG. 4 is an end elevational view of the device in the deployed condition.
Figure 5:
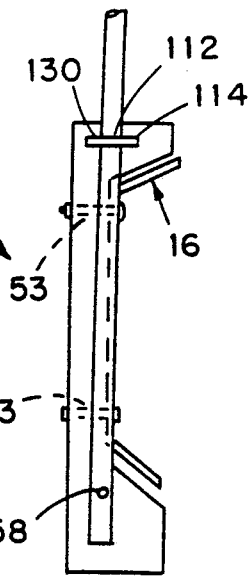
FIG. 5 is an end elevational view of the device in the stored condition.
Figure 6:
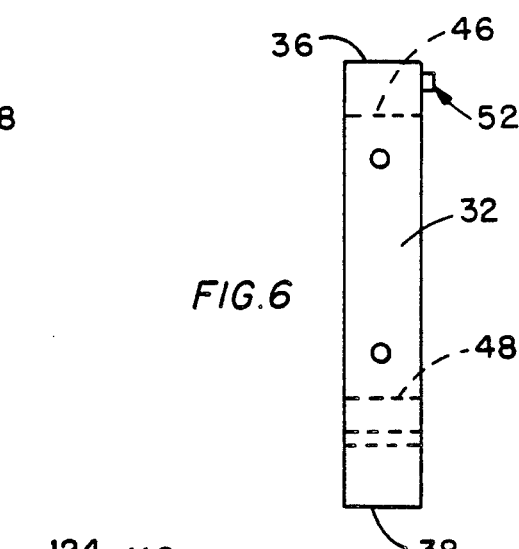
FIG. 6 is a front elevational view of a base unit of the device of the present invention.

Referring to FIGS. 3, 4 and 5, it is seen that the device 20 includes a base unit 22 fixed to the front bumper 16 to be located in front of that bumper. The base unit 22 includes a monolithic body 24 which has a top section 26, a bottom section 28 and a central section 30. The body 24 also includes a front surface 32 which faces forwardly of the vehicle from the front bumper, and a rear surface 34 which faces towards the front bumper. The front surface 32 is planar and extends from top end 36 to bottom end 38 of the base unit body. The rear surface is shaped to be concave whereby a planar central portion 40 that extends parallel to the front surface 32 and connects two sloping portions 42 and 44 which converge towards each other towards the front surface 32 to form corners 46 and 48 at the intersection thereof with the central portion 40. The corners are located adjacent to corresponding corners in a bumper 16, or extend over the edges of the bumper, such as edges T and B of a planar bumper as shown in FIG. 1. The monolithic nature of the base unit body provides strength to that element, and facilitates manufacture thereof; whereas, the corners of the base unit body ensure a secure fit between the body base and the bumper.

A stop element 50 is mounted on the base unit body near the bottom end 38 and extends outwardly from that base unit, and a lock element 52 is pivotally mounted on the base unit body near the top end 36. The purpose of each of these elements will be understood from the ensuing discussion. Fastener elements, such as bolts 53 extend through bolt holes defined in the base unit body and through the bumper 16 to firmly affix the base unit to the bumper.

The device 20 further includes a platform/grill cover unit 54 pivotally attached at a proximal end 56 thereof to the base unit body by a pivot pin 58 located adjacent to the stop element 50. The unit 54 moves between the FIG. 4 deployed position and the FIG. 5 stored position by pivoting about the pivot pin 58 as indicated by double-headed arrow 60. The proximal end 56 abuts the stop element 50 to lock the unit 54 in the FIG. 4 deployed condition, and the lock element 52 moves between a releasing position shown in FIG. 4 to a locking position shown in FIG. 5 to respectively release or lock the unit 54 in a stored condition as indicated by double-headed arrow 62.

The unit 54 is best shown in FIG. 3 as including a monolithic frame 66. The monolithic nature of the frame makes the unit 54 sturdy and easily manufacturable. The frame includes a rectangular central section 68 having two ends 70 and 72 and two sides 74 and 76, with the ends 70 and 72 extending beyond side 76 to form legs 78 and 80 respectively. The legs 78 and 80 are hollow channel members so ball elements can be used in conjunction with the unit 54.

The unit 54 further includes two identical wing sections 82 and 84. Since the wing units are identical, only wing unit 82 will be discussed, it being understood that the discussion applies to wing unit 84 as well.

The wing unit 82 includes a frame 88 which is in the shape of a parallelogram having the end 72 forming one side of the parallelogram and a side 90 parallel to that end 72, and two other parallel sides 92 and 94 forming the remaining sides of the parallelogram. A square frame 96 is located within the parallelogram frame 88 and includes end 72 forming one leg thereof and side 90 forming another leg thereof, with additional legs 98 and 100 forming the remaining portions of the square. The square frames 96 surround a vehicle headlight when the unit 54 is in the FIG. 5 stored position thereby adding protection to the headlights in the event the front end of the vehicle accidentally contacts an object.

Each leg 78 and 82 includes a pivot pin 58 for attaching the unit 54 to the base unit.

The wing section 82 further includes a triangular mesh section 104 between legs 90, 92 and 96, and a trapezoidal mesh section 106 between legs 72, 90, 94 and 98. The central section includes a rectangular mesh section 108 between legs 70, 72, 74 and 76. The mesh sections are steel to securely support a user when the unit 54 is used as a platform.

Figure 8:
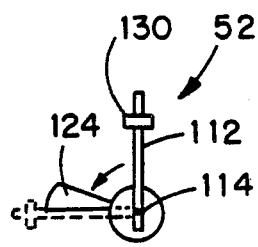
FIG. 8 is a front view of the lock element of the device of the present invention.
Figure 7:
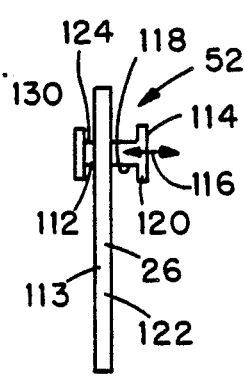
FIG. 7 is side elevational view of a lock element of the device of the present invention.

The lock element 52 can be several different forms, such as an over-center lock or a cam lock as shown in FIGS. 7 and 8. The lock element 52 includes a body 112 pivotally attached to the base unit body by a pivot pin 114 that can move left or right in FIG. 7 which is into or out of the plane of the paper in FIG. 4 as indicated by double-headed arrow 116. A compression spring 118 surrounds the pivot pin and biases this pin toward the right in FIG. 7 to bias the body 112 toward outer surface 113 of the base unit body. A rear knob 120 engages the inside surface of the base unit body, and the spring engages inner surface 122 of the body and the knob 114. The lock element further includes a cam element 124 mounted on the outside surface 113 of the body. The body 112 must move over the cam to move from the upright position shown in full lines in FIG. 8 to the horizontal position shown in dotted lines in FIG. 8. The cam element then locks the body 112 in the horizontal position until it is again lifted away from the body surface 113 and moved back over the cam.

The locking element also includes a locking projection 130 which fits in front of the legs 90 of the unit 54 to lock the unit 54 into the upright position as shown in FIG. 5.

Figure 9:
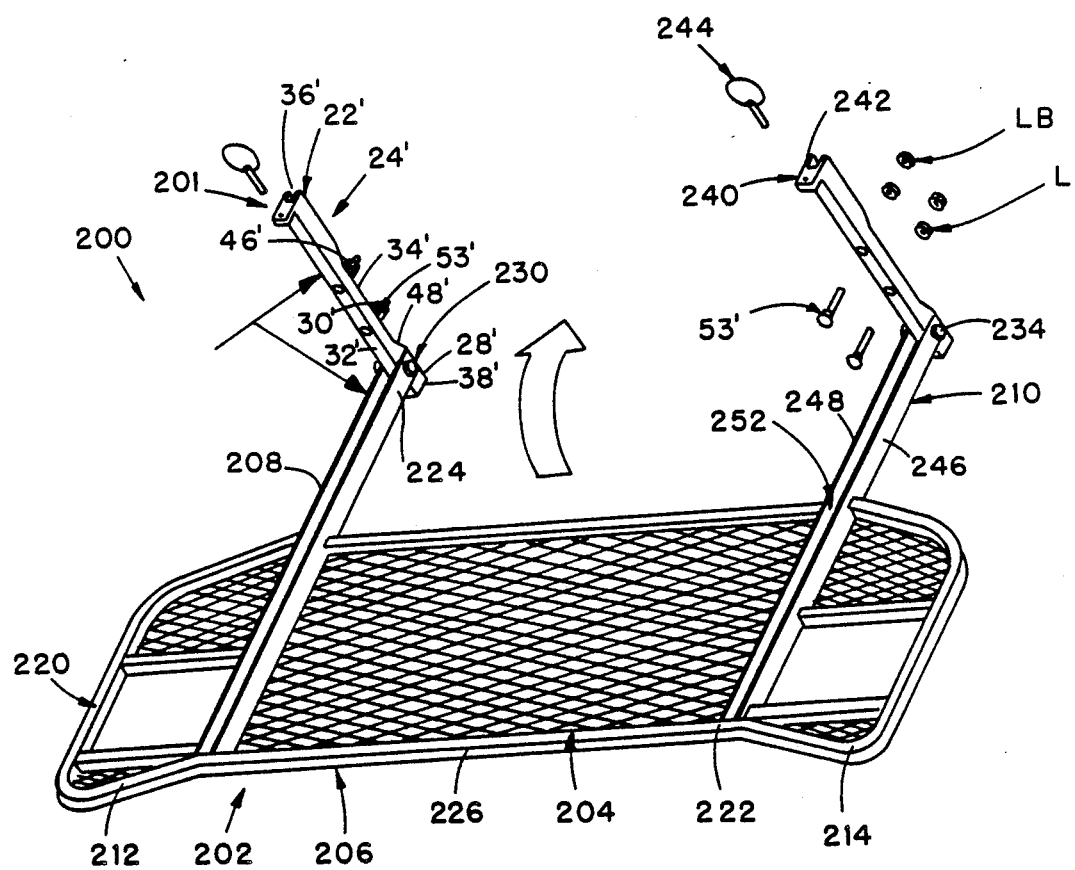
FIG. 9 is an exploded perspective view of a second form of the device of the present invention.
Figure 10:
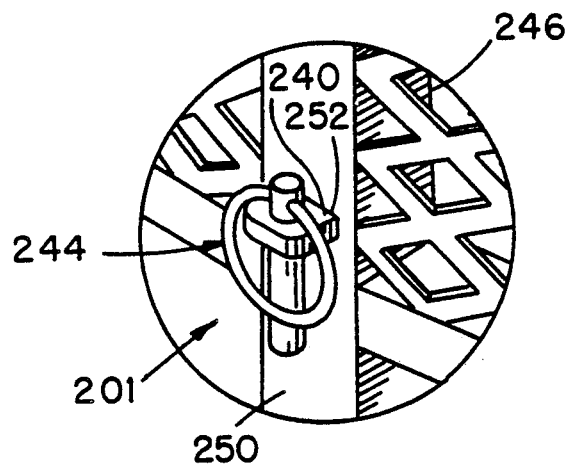
FIG. 10 is a detail of a locking element used to attach the device to the front of a vehicle in a stored configuration.
Figure 11:
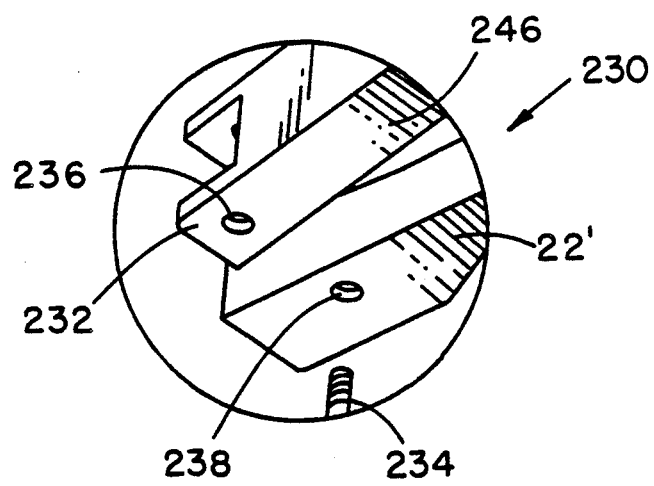
FIG. 11 is a detail of a hinge element used to attach the device to the front of a vehicle.

Referring next to FIGS. 9-11, a second form of the device embodying the present invention is shown. The device 200 embodying the second form of the invention is similar to the device 20 and moves between a deployed configuration extending outwardly from the front of the vehicle, and a stored configuration extending upwardly in front of the grille of the vehicle.

The device 200 includes a base unit 22' fixed to the front bumper 16 to be located in front of that bumper. The base unit 22' includes a monolithic body 24' which has a top section 26', a bottom section 28' and a central section 30'. The body 24' also includes a front surface 32' which faces forwardly of the vehicle from the front bumper, and a rear surface 34' which faces towards the front bumper. The front surface 32' is planar and extends from top end 36' to bottom end 38' of the base unit body. The rear surface is shaped to be concave whereby a planar central portion 40' connects two sloping portions 42' and 44' which converge towards each other towards the front surface 32' to form corners 46' and 48' at the intersection thereof with the central portion 40'. The corners are located adjacent to corresponding corners in a bumper 16, or extend over the edges of the bumper, such as edges T and B of a planar bumper as shown in FIG. 1. The monolithic nature of the base unit body provides strength to that element, and facilitates manufacture thereof; whereas, the corners of the base unit body ensure a secure fit between the body base and the bumper.

Fastener elements, such as bolts 53' extend through bolt holes defined in the base unit body and through the bumper 16 to firmly affix the base unit to the bumper using lock washers L and bolts LB. Each base unit body further includes a lock assembly 201 that will be discussed in further detail below.

The device 200 further includes a platform/grille unit 202 having a main body section 204 that includes a rectangular central section 206 extending between two support braces 208 and 210, and two wing sections 212 and 214, each of which is attached to one of the support braces. The wing sections are identical and each includes a square opening, such as opening 220 in wing section 212 to accommodate a headlight of the vehicle when the unit 202 is in the upward stowed configuration. Each brace 208 and 210 has a distal end, such as end 222 of brace 210, and a proximal end, such as end 224 of brace 208, with the distal ends contacting a top edge 226 of the body section and the proximal ends being connected to the front bumper of the vehicle.

Each brace is pivotally connected to each base unit by a pivot pin connection 230 shown in FIGS. 9 and 11. The connection 230 includes a yoke-like end 232 on the brace proximal end, and a pivot pin 234 extending through aligned holes 236 and 238 on the brace and on the base respectively.

The platform/grille cover unit 204 is locked into the FIG. 9 deployed configuration by a stop element mounted on the base unit body near the bottom end thereof and which extends outwardly of that base unit as discussed above with reference to stop element 50.

The unit 204 is attached to the braces in an upward stowed configuration by means of lock elements 201. The lock elements are shown in FIGS. 9 and 10, and each lock element 201 includes a projection 240 located on top of each base unit and having a hole 242 defined therethrough. An overcenter lock pin 244 fits through the hole of each projection as indicated in FIG. 10. As indicated in FIG. 9, each brace is channel-shaped to include sides 246 and 248 connected together by a bight section 250. A slot 252 is defined through the bight section 250 to receive the projection 240 therethrough. As can be seen by comparing FIGS. 9 and 10, the platform/grille cover unit 54 is held in the deployed configuration (FIG. 9) by the stop elements, and in the stowed configuration (FIG. 10) by the lock elements 201.

It is noted that the wing sections of the device 200 are identical to the wing sections of the unit device 20. Accordingly, the wing sections of the device 200 will not be discussed.

It is understood that while certain forms of the present invention have been illustrated and described herein, it is not to be limited to the specific forms or arrangements of parts described and shown.

We claim:

1. A device for use on a front bumper of a land vehicle comprising:
   A) a base unit fixed to a front bumper of a land vehicle, said base unit including
      (1) a body having a top end, a bottom end, a top section, a bottom section, a planar front surface which faces forwardly of the land vehicle front bumper, and a concave rear surface located adjacent to the front bumper, said rear surface having a top portion, a bottom portion, and a planar central portion connecting said top portion to said bottom portion, said top and bottom portions converging towards each other towards said front surface, said central portion extending parallel to said front surface, and
      (2) fasteners releasably attaching said base unit body to the vehicle bumper;
   B) a platform/grill cover unit which includes
      (1) a body which includes
         (a) a rectangular central section having two sides and two ends,
         (b) said ends each extending beyond one of said sides and each having a bolt hole defined therethrough, said sides being hollow,
         (c) two identical wing sections, each wing section including
            (i) a parallelogram shaped frame having one side formed by one end of said rectangular central section and further including a second side and two ends, and
            (ii) a square shaped frame having one end formed by said rectangular central section one end, a second end formed by said second side of said parallelogram shaped frame, and two other ends, with one of said other ends being a linear extension of one of said central section sides,
         (d) a triangular mesh system formed between each square shaped frame and one end of said parallelogram shaped frame in each wing section,
         (e) a trapezoidal mesh system formed between each square shaped frame and the other side of said parallelogram shaped frame in each wing section, and
         (f) a rectangular mesh system in said central section and covering an inner area within said rectangular central section;
   C) fastening means on each of said sides of the central section pivotally attaching said platform/grill cover unit to said base unit body section;
   D) a lock element mounted on said base unit body adjacent to said body top end and including a projection element for engaging said platform/grill cover unit when said cover unit is in an upright position; and
   E) a stop element fixed to said base unit body adjacent to said base unit body bottom end for abuttingly engaging said platform/grill cover unit when said unit is in a deployed condition.

* * * * *